United States Patent
Sakata (10) Patent No.: US 9,249,296 B2
(45) Date of Patent: Feb. 2, 2016

(54) INTEGRATED MOLDED PRODUCT

(75) Inventor: Kouichi Sakata, Fuji (JP)

(73) Assignee: POLYPLASTICS CO., LTD., Toyko (JP)

( * ) Notice: Subject to any disclaimer, the term of this patent is extended or adjusted under 35 U.S.C. 154(b) by 407 days.

(21) Appl. No.: 13/823,711

(22) PCT Filed: Aug. 17, 2011

(86) PCT No.: PCT/JP2011/068614
§ 371 (c)(1),
(2), (4) Date: Jun. 18, 2013

(87) PCT Pub. No.: WO2012/035922
PCT Pub. Date: Mar. 22, 2012

(65) Prior Publication Data
US 2013/0274390 A1  Oct. 17, 2013

(30) Foreign Application Priority Data

Sep. 17, 2010 (JP) .................................. 2010-208889

(51) Int. Cl.
*B32B 7/04* (2006.01)
*B32B 7/12* (2006.01)
(Continued)

(52) U.S. Cl.
CPC ................. *C08L 67/02* (2013.01); *C08J 5/128* (2013.01); *C08K 5/5313* (2013.01); *B32B 7/04* (2013.01); *B32B 7/12* (2013.01); *B32B 25/04* (2013.01); *B32B 25/08* (2013.01); *B32B 25/20* (2013.01); *B32B 27/08* (2013.01); *B32B 27/18* (2013.01); *B32B 27/28* (2013.01); *B32B 27/283* (2013.01); *B32B 27/36* (2013.01); *B32B 2250/03* (2013.01); *B32B 2307/3065* (2013.01);
(Continued)

(58) Field of Classification Search
None
See application file for complete search history.

(56) References Cited

U.S. PATENT DOCUMENTS 4,102,853 A * 7/1978 Kawamura et al. ........... 524/425
4,536,531 A * 8/1985 Ogawa et al. ................. 524/135
(Continued)

FOREIGN PATENT DOCUMENTS

| JP | 8-73720 A | 3/1996 |
|----|-----------|--------|
| JP | 9-165503 A | 6/1997 |

(Continued)

OTHER PUBLICATIONS

Notice of Reasons for Rejection issued to Japanese Application No. 2010-208889, mailed Jul. 15, 2014.
(Continued)

*Primary Examiner* — Vivian Chen
(74) *Attorney, Agent, or Firm* — Knobbe Martens Olson & Bear LLP (57) ABSTRACT

To provide a technique in which a phosphorus compound does not inhibit curing of an addition reaction type silicone-based composition even though the addition reaction type silicone-based composition is in contact with a resin molded product containing the phosphorus compound. An integrated molded product including a thermoplastic resin molded product containing a phosphorus compound, an addition reaction type silicone-based composition, and a member, in which: the thermoplastic resin molded product is in contact with the addition reaction type silicone-based composition; and a pentavalent phosphorus compound is used as the phosphorus compound. The thermoplastic resin molded product preferably contains a polybutylene terephthalate resin in light of heat resistance.

4 Claims, 3 Drawing Sheets (51) Int. Cl.
| | |
|---|---|
| *B32B 25/04* | (2006.01) |
| *B32B 25/08* | (2006.01) |
| *B32B 25/20* | (2006.01) |
| *B32B 27/08* | (2006.01) |
| *B32B 27/18* | (2006.01) |
| *B32B 27/28* | (2006.01) |
| *B32B 27/36* | (2006.01) |
| *C08L 67/02* | (2006.01) |
| *C08L 67/03* | (2006.01) |
| *C08L 83/04* | (2006.01) |
| *C09J 183/04* | (2006.01) |
| *C08K 3/32* | (2006.01) |
| *C08K 5/49* | (2006.01) |
| *C08K 5/51* | (2006.01) |
| *C08K 5/52* | (2006.01) |
| *C08K 5/521* | (2006.01) |
| *C08K 5/524* | (2006.01) |
| *C08K 5/53* | (2006.01) |
| *C08K 5/5313* | (2006.01) |
| *C08K 5/5317* | (2006.01) |
| *C08K 5/5333* | (2006.01) |
| *C08J 5/12* | (2006.01) |
| *C08K 3/00* | (2006.01) |
| *C08K 5/00* | (2006.01) |

(52) U.S. Cl.
CPC ........ *B32B 2367/00* (2013.01); *B32B 2383/00* (2013.01); *C08J 2367/02* (2013.01); *C08J 2367/04* (2013.01); *C08J 2383/04* (2013.01); *C08K 3/0008* (2013.01); *C08K 3/0041* (2013.01); *C08K 3/0058* (2013.01); *C08K 3/32* (2013.01); *C08K 5/005* (2013.01); *C08K 5/0008* (2013.01); *C08K 5/0066* (2013.01); *C08K 5/0091* (2013.01); *C08K 5/49* (2013.01); *C08K 5/51* (2013.01); *C08K 5/52* (2013.01); *C08K 5/521* (2013.01); *C08K 5/524* (2013.01); *C08K 5/53* (2013.01); *C08K 5/5317* (2013.01); *C08K 5/5333* (2013.01); *C08K 2003/321* (2013.01); *C08K 2003/324* (2013.01); *C08K 2003/325* (2013.01); *C08K 2003/326* (2013.01); *C08K 2003/329* (2013.01); *C08L 67/03* (2013.01); *C08L 83/04* (2013.01); *C08L 2201/02* (2013.01); *C08L 2201/08* (2013.01); *C08L 2203/20* (2013.01); *C09J 183/04* (2013.01); *Y10T 428/31786* (2015.04)

(56) References Cited

U.S. PATENT DOCUMENTS

| | | | | |
|---|---|---|---|---|
| 5,106,933 | A | * | 4/1992 | Kobayashi et al. ............ 528/15 |
| 5,360,858 | A | * | 11/1994 | Fujiki et al. .................. 524/434 |
| 5,780,534 | A | | 7/1998 | Kleiner et al. |
| 5,792,812 | A | * | 8/1998 | Fujiki et al. .................. 525/105 |
| 6,004,679 | A | * | 12/1999 | Mitchell et al. .............. 428/446 |
| 6,013,707 | A | * | 1/2000 | Kleiner et al. ................ 524/126 |
| 6,762,235 | B2 | * | 7/2004 | Takenaka et al. ............. 524/494 |
| 8,142,888 | B2 | * | 3/2012 | Sakata et al. ................. 428/325 |
| 8,404,763 | B2 | * | 3/2013 | Sakata et al. ................. 523/506 |
| 8,734,956 | B2 | * | 5/2014 | Sakata et al. ................. 428/447 |
| 8,796,367 | B2 | * | 8/2014 | Tsunoda et al. .............. 524/126 |
| 2002/0028335 | A1 | * | 3/2002 | Fujiki et al. .................. 428/447 |
| 2003/0004240 | A1 | * | 1/2003 | Harashina et al. ............ 524/138 |
| 2003/0220443 | A1 | * | 11/2003 | Kameda et al. ............... 524/588 |
| 2004/0192812 | A1 | * | 9/2004 | Engelmann et al. .......... 524/100 |
| 2005/0137297 | A1 | * | 6/2005 | De Wit .......................... 524/100 |
| 2008/0081886 | A1 | * | 4/2008 | Yamamoto et al. ............ 526/90 |
| 2008/0139711 | A1 | * | 6/2008 | Borade et al. ................. 524/100 |
| 2008/0167406 | A1 | * | 7/2008 | Yamada ........................ 524/116 |
| 2010/0168289 | A1 | * | 7/2010 | Ding et al. .................... 524/100 |
| 2010/0168290 | A1 | * | 7/2010 | Ding et al. .................... 524/100 |
| 2010/0266857 | A1 | * | 10/2010 | Sakata et al. ................. 428/451 |
| 2010/0267891 | A1 | * | 10/2010 | Sakata et al. ................. 524/523 |
| 2011/0092616 | A1 | * | 4/2011 | Sakata et al. ................. 523/506 |
| 2011/0201730 | A1 | * | 8/2011 | Tsunoda et al. .............. 524/100 |
| 2013/0324649 | A1 | * | 12/2013 | Doi et al. ...................... 524/120 |

FOREIGN PATENT DOCUMENTS

| | | | |
|---|---|---|---|
| JP | 2002-52667 | A | 2/2002 |
| JP | 2002-161211 | A | 6/2002 |
| JP | 2003-25516 | A | 1/2003 |
| JP | 2004-343684 | A | 12/2004 |
| JP | 2004-537630 | A | 12/2004 |
| JP | 2007-009119 | * | 1/2007 |
| JP | 2007-9119 | A | 1/2007 |
| JP | 2007-077205 | * | 3/2007 |
| JP | 2007-77205 | A | 3/2007 |
| JP | 2009-149736 | A | 7/2009 |
| JP | 2009-215347 | A | 9/2009 |
| WO | WO 2009/081572 | * | 7/2009 |
| WO | WO 2009/081573 | * | 7/2009 |
| WO | WO 2009/150833 | * | 12/2009 |
| WO | WO 2010/010690 | * | 1/2010 |

OTHER PUBLICATIONS

Office Action issued to U.S. Appl. No. 13/880,996, mailed Feb. 19, 2014.

International Search Report for PCT/JP2011/068614, mailed Sep. 20, 2011.

* cited by examiner

INTEGRATED MOLDED PRODUCT

CROSS-REFERENCE TO RELATED APPLICATIONS

This application is the National Stage of International Application No. PCT/JP2011/068614, filed Aug. 17, 2011, which claims the benefit of Japanese Application No. 2010-208889, filed Sep. 17, 2010, the entire contents of both of which are incorporated by reference herein.

TECHNICAL FIELD

The present invention relates to an integrated molded product.

BACKGROUND ART

A resin molded product obtained by molding a thermoplastic resin is used for various products and parts since it has features such as easy molding and light-weight.

The resin molded product is sometimes bonded with other members depending on applications, etc. There have been known, as a method in which a resin molded product is bonded with other members, methods such as bonding with an adhesive, screw fastening, double-shot molding, hot plate welding, vibration welding, and laser welding. The bonding method is selected taking account of applications and shape of a resin molded product, and a preferable bonding method varies depending on applications, etc. Since it is difficult to use welding processing in the case of bonding with different type resins and metals, techniques such as adhesion, screw fastening, and staking are commonly employed.

An example of bonding a resin molded product with other members includes a case material (case material composed of a resin molded product) which houses a substrate including electronic parts mounted thereon (Patent Document 1). The reason why the substrate is housed in the case material is to relieve damage of electronic parts, caused by dusts and external impact, etc.

Electronic parts housed in the above case material are sometimes subjected to potting. The reason is to prevent electronic parts from rusting by moisture, etc. Examples of electronic parts subjected to the potting include various automobile electronic control systems, sensors, hybrid ICs for automobiles and electric appliances, and semiconductor parts, etc (Patent Document 2).

An adhesive is used to bond the case housing the above substrate and electronic parts with a lid, or to fix them in a case, and an epoxy-based composition and a silicone-based composition, etc. are known as potting agents used to apply potting. In the case of an integrated molded product to which heat resistance and cold resistance, etc. are required, an addition reaction type silicone-based composition (type in which curing is performed using a platinum catalyst) is preferably used. It is known that this addition reaction type silicone-based composition is also used as a sealing agent and a coating agent, etc., in addition to the above adhesive and potting agent.

In the case of using the addition reaction type silicon-based composition, when a phosphorus compound is contained in a resin molded product, this phosphorus compound inhibits an addition reaction due to a platinum catalyst (cure inhibition). As a result, when the addition reaction type silicone-based composition is used as an adhesive, adhesion between a resin molded product and other members is likely to be insufficient. When the addition reaction type silicone-based composition is used as a potting agent, malfunction of electronic parts due to rusts may occur since electronic parts are in contact with air due to cure inhibition.

Usually, the phosphorus compound is added for the purpose of imparting desired physical properties to a resin molded product, etc. For example, the phosphorus compound can be added to a resin as a flame retardant and a stabilizer, and exerts the effect of imparting flame retardance to a resin composition and preventing deterioration of physical properties or discoloration under high-temperature conditions. As mentioned above, the phosphorus compound is known as a useful additive, and the phosphorus compound is often contained in a resin composition as an essential component.

As mentioned above, the phosphorus compound is known as a useful additive, but it would be unsuited to be mixed in a resin molded product which is in contact with an addition reaction type silicone-based composition.

Patent Document 1: Japanese Unexamined Patent Application, Publication No. 2004-343684

Patent Document 2: Japanese Unexamined Patent Application, Publication No. 2009-149736

DISCLOSURE OF THE INVENTION

Problems to be Solved by the Invention

The present invention has been made so as to solve the above problems, and an object thereof is to provide a technique in which a phosphorus compound does not inhibit curing of an addition reaction type silicone-based composition even though the addition reaction type silicone-based composition is in contact with a resin molded product containing the phosphorus compound.

Means for Solving the Problems

The present inventors have intensively studied so as to solve the above problems. As a result, they have found that the use of a pentavalent phosphorus compound among phosphorus compounds does not cause a problem that a phosphorus compound inhibits curing of an addition reaction type silicone-based composition, and thus completing the present invention. More specifically, the present invention provides the followings.

(1) An integrated molded product comprising a thermoplastic resin molded product, addition reaction type silicone-based composition, and a member, the thermoplastic resin molded product comprising a pentavalent phosphorus compound, and the thermoplastic resin molded product being in contact with the addition reaction type silicone-based composition.

(2) The integrated molded product according to (1), wherein the thermoplastic resin molded product includes a polybutylene terephthalate-based resin.

(3) The integrated molded product according to (1) or (2), wherein the pentavalent phosphorus compound is at least one selected from the group consisting of a phosphinate represented by the following general formula (I), and a diphosphinate represented by the following general formula (II):

(II)

wherein, $R^1$, $R^2$, $R^3$ and $R^4$ are each the same or different and represent an alkyl group, a cycloalkyl group, an aryl group or an aralkyl group, and $R^5$ represents an alkylene group, an alicyclic bivalent group or an aromatic bivalent group; $R^1$ and $R^2$ may join with each other to form a ring together with adjacent phosphorus atoms; $M^{m+}$ represents a metal having a valence of m, and m is an integer of 2 to 4; and $M^{n+}$ represents a metal having a valence of n, and n is an integer of 2 to 4.

(4) The integrated molded product according to (1) or (2), wherein the pentavalent phosphorus compound is a phosphoric ester.

(5) The integrated molded product according to (1) or (2), wherein the pentavalent phosphorus compound is at least one selected from the group consisting of an alkali metal phosphate and an alkaline earth metal phosphate.

Effects of the Invention

In the present invention, since a pentavalent phosphorus compound is used as a phosphorus compound, the phosphorus compound does not inhibit curing of an addition reaction type silicone-based composition.

BRIEF DESCRIPTION OF THE DRAWINGS

FIG. 3 is a schematic view showing an integrated molded product of Example, in which

EXPLANATION OF REFERENCE NUMERALS

1: Integrated molded product
10: Case
101: First bonding surface
11: Cover
111: Second bonding surface
12: Addition reaction type silicone-based composition

PREFERRED MODE FOR CARRYING OUT THE INVENTION

Embodiments of the present invention will be described in detail below, but the present invention is not limited to the embodiments.

An integrated molded product of the present invention includes a thermoplastic resin molded product, an addition reaction type silicone-based composition, and a member. The thermoplastic resin molded product may be a single molded product, or may be composed of a plurality of molded products. When the thermoplastic resin molded product is composed of two molded products, for example, a first thermoplastic resin molded product and a second thermoplastic resin molded product, it is possible to exemplify an integrated molded product obtained by bonding by an addition reaction type silicone-based composition (sometimes simply referred to as a silicone-based composition in the following descriptions). A pentavalent phosphorus compound is contained in at least one of the first thermoplastic resin molded product and the second thermoplastic resin molded product. The resin containing the pentavalent phosphorus compound corresponds to the above thermoplastic resin molded product. When the pentavalent phosphorus compound is contained in both resins, any one may be used as the thermoplastic resin molded product.

In the case of the single molded product, a member may be adhered to a molded product thereof by a silicone-based composition; or a member may be bonded to a thermoplastic resin molded product by screw fastening, and the periphery may be coated with a silicone-based composition; or a member may be housed in a container-shaped molded product, and may be potted with a silicone-based composition. First, a schematic example of the integrated molded product of the present invention will be described with reference to the accompanying drawings.

Figure 1A:
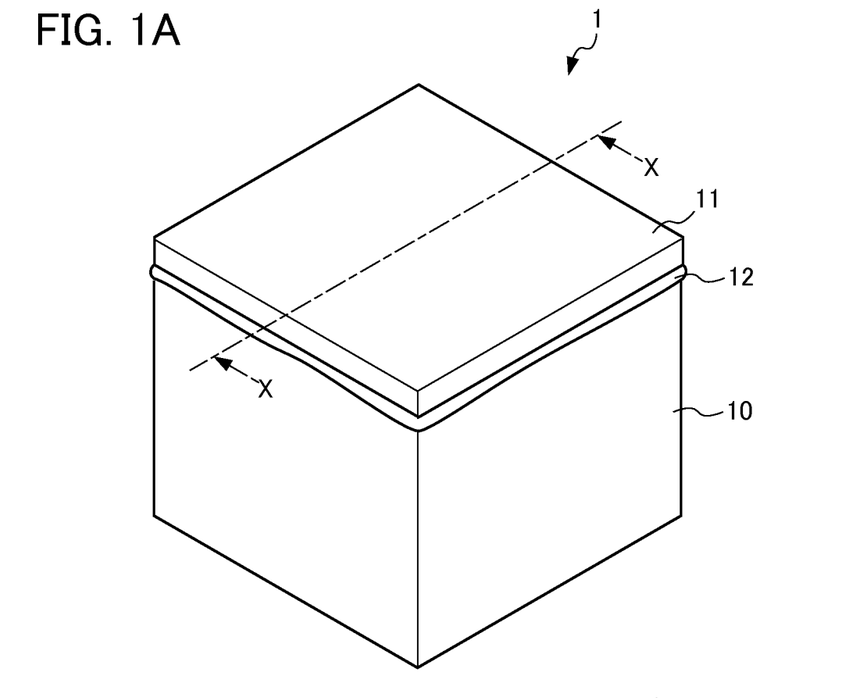
FIG. 1A is a perspective view schematically showing an integrated molded product 1 of a first embodiment.
Figure 1B:
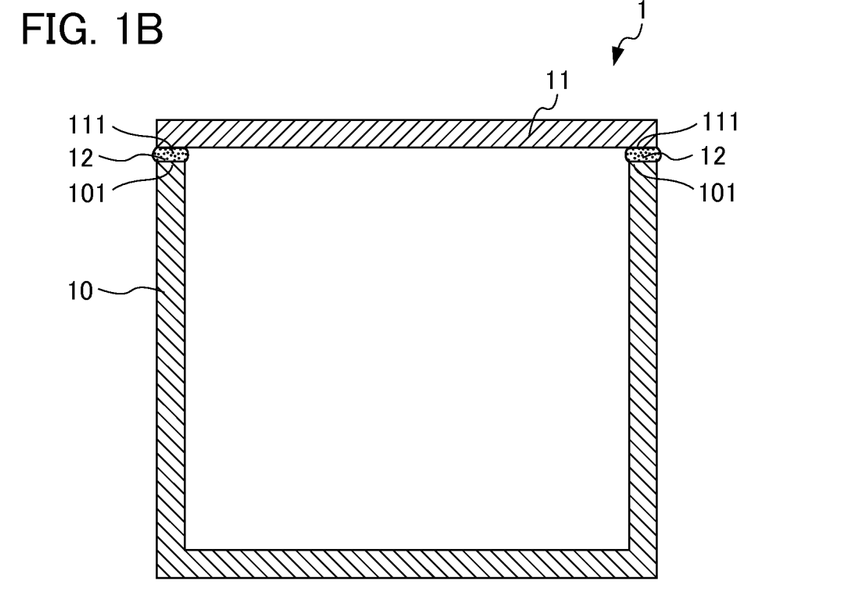
FIG. 1B is a cross-sectional view schematically showing a cross section taken along the line X-X of FIG. 1A.

FIG. 1 is a view showing a first embodiment of an integrated molded product of the present invention, FIG. 1A is a perspective view schematically showing the integrated molded product 1 of the first embodiment, and FIG. 1B is a cross-sectional view schematically showing a cross section taken along the line X-X of FIG. 1A.

As shown in FIG. 1, an integrated molded product 1 includes a case 10, a cover 11 and an addition reaction type silicone-based composition 12, and the case 10 is bonded to the cover 11 by the addition reaction type silicone-based composition 12 to form a box structure as a whole.

The case 10 is a box-shaped part having an opening on one surface, and corresponds to the thermoplastic resin molded product in the present invention. The case 10 has, on an end surface of a surface including an opening existing thereon, a first bonding surface 101 for bonding to the cover 11 through the addition reaction type silicone-based composition 12.

The cover 11 is a plate-shaped molded product, and corresponds to the member in the present invention. The cover 11 has, on an outer periphery of one surface, a second bonding surface 111 for bonding to the case 10 through the addition reaction type silicone-based composition 12.

It is required for the case 10 and the cover 11 to have heat resistance enough to endure a curing temperature of the addition reaction type silicone-based composition. Therefore, the case 10 and the cover 11 preferably use, as a raw material, a thermoplastic resin having high heat resistance (details will be mentioned below).

The addition reaction type silicone-based composition 12 functions as an adhesive for bonding a first bonding surface 101 to a second bonding surface 111. A method of bonding by the addition reaction type silicone-based composition 12 is preferable since a decrease in an adhesive force due to heat does not occur.

A method for producing an integrated molded product of a first embodiment shown in FIG. 1 will be briefly described. An addition reaction type silicone-based composition 12 are applied to at least one surface of a first bonding surface 101 and a second bonding surface 111, and then the first bonding surface 101 is bonded to the second bonding surface 111 by bringing the first bonding surface 101 into contact with the second bonding surface 111.

The embodiment mentioned above is a first embodiment of an integrated molded product of the present invention, and is an embodiment in which an addition reaction type silicone-based composition is used as an adhesive. A description will be made on an embodiment (second embodiment) in which an addition reaction type silicone-based composition is used as a potting agent.

Figure 2A:
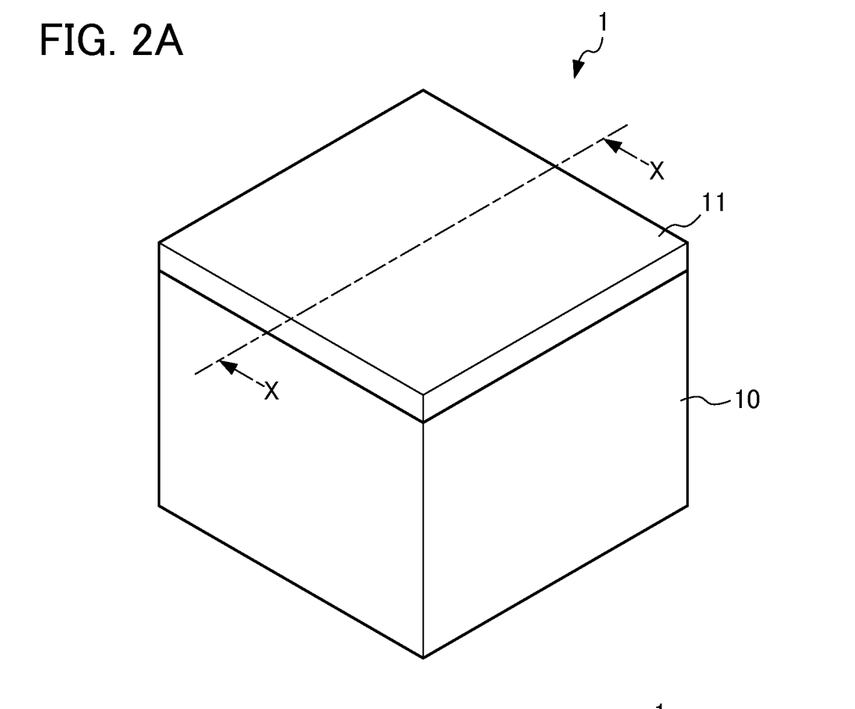
FIG. 2A is a perspective view schematically showing an integrated molded product 1 of a second embodiment.
Figure 2B:
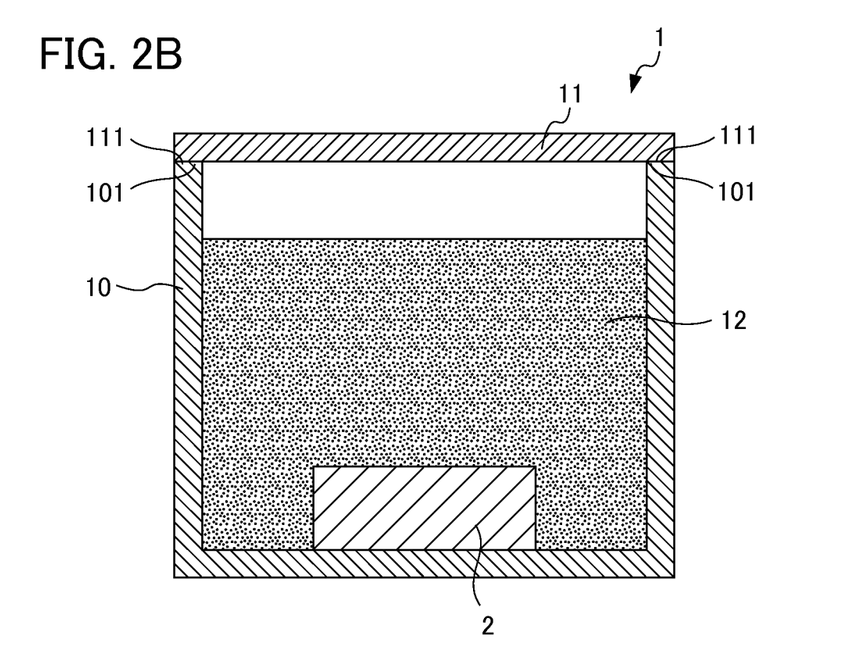
FIG. 2B is a cross-sectional view schematically showing a cross section taken along the line X-X of FIG. 2A.

FIG. 2 is a view showing an integrated molded product of a second embodiment. FIG. 2A is a perspective view schematically showing the integrated molded product 1 of the second embodiment, and FIG. 2B is a cross-sectional view schematically showing a cross section taken along the line X-X of FIG. 2A. An integrated molded product 1 of the second embodiment is different from the integrated molded product of first embodiment in that the integrated molded product of the second embodiment has a configuration in which electronic parts 2 are disposed inside the integrated molded product 1, and also has a configuration in which the periphery of the electronic parts 2 is covered with the addition reaction type silicone-based composition 12; and that bonding of the case 10 with the cover 11 is not limited to the case where the addition reaction type silicone-based composition is used, and bonding is sometimes performed by screw fastening or welding. In the following descriptions, the same reference numerals are used for components identical to those of the first embodiment, and the descriptions are omitted or simplified.

The electronic parts 2 are electronic parts such as sensors, hybrid ICs for automobiles and electric appliances, and semiconductor parts, etc. and are disposed on a bottom surface of the case 10 by a conventionally known general method so as to be surrounded by the case 10 and the cover 11. The conventionally known general method includes, for example, a method in which electronic parts are disposed using an adhesive, or by screw fastening. Either an addition reaction type silicone-based composition or other adhesives may be used as the adhesive. As shown in FIG. 2B, the periphery of the electronic parts 2 is surrounded by the addition reaction type silicone-based composition 12.

The addition reaction type silicone-based composition 12, with which the periphery of the electronic parts 2 is covered, is provided in the space surrounded by the case 10 and cover 11, and the electronic parts 2 so that the electronic parts 2 are completely immersed in the addition reaction type silicone-based composition 12. The addition reaction type silicone-based composition 12 functions as a potting agent.

A description will be briefly made on a method for producing an integrated molded product of a second embodiment show in FIG. 2. The electronic parts 2 are disposed on the bottom of the case 10, then inside the case 10 is filled with the addition reaction type silicone-based composition 12, and the first bonding surface 101 is bonded to the second bonding surface 111.

Effects exerted by the integrated molded product of the present invention will be briefly described below. As mentioned above, the integrated molded product obtained from the addition reaction type silicone-based composition is very useful since it is less likely to be influenced by heat. Furthermore, according to the present invention, since a phosphorus compound can be added to a thermoplastic resin molded product, it is possible to impart flame retardance and properties capable of stably existing in high temperature to a thermoplastic resin molded product, and thus obtaining a integrated molded product which can be preferably used under high-temperature conditions.

Conventionally, it has been considered that, in case a resin molded product containing a phosphorus compound is bonded with other resin molded products, the phosphorus compound inhibits curing of an addition reaction type silicone-based composition when using an addition reaction type silicone-based composition, and thus it is impossible to obtain an integrated molded product in which resin molded products are sufficiently in closed contact with each other. In a silicone potting agent for protecting electronic parts, cure inhibition causes contact of the electronic parts with air, and thus rusts may cause malfunction of the electronic parts.

However, in the present invention, since the pentavalent phosphorus compound is used as the phosphorus compound, as mentioned above, the phosphorus compound does not inhibit curing of the addition reaction type silicone-based composition. As a result, the integrated molded product of the present invention becomes an integrated molded product in which resin molded products and electronic parts are sufficiently adhered to each other, and also reliability of an interior substrate is improved, in spite of the fact that the resin molded product contains a phosphorus compound.

As mentioned above, the present invention enables combination of a resin molded product containing a phosphorus compound and an addition reaction type silicone-based composition, which has conventionally been considered to be impossible to be combined with each other. The thermoplastic resin molded product, the addition reaction type silicone-based composition, and the member will be described in more detail below.

While a description was made on an integrated molded product of the present invention in case where an addition reaction type silicone-based composition is used as an adhesive and an potting agent, an integrated molded product in which an addition reaction type silicone-based composition is used as a sealing agent and a coating agent is also included in the present invention.

While a description was made by way of a box-shaped integrated molded product including a case and a cover as an example, the integrated molded product is not limited to a box-shaped integrated molded product and, for example, an integrated molded product, in which electronic parts are adhered to a thermoplastic resin molded product as other members using an addition reaction type silicone-based composition, is also included in the present invention.

Thermoplastic Resin Molded Product

A thermoplastic resin molded product is obtained by molding a resin composition containing a thermoplastic resin and a phosphorus compound. A thermoplastic resin, a phosphorus compound, and other containable components (other components) will be described below in this order.

Thermoplastic Resin

The thermoplastic resin used in the production of a thermoplastic resin molded product is not particularly limited, and a common thermoplastic resin can be used. It is possible to use, for example, thermoplastic resins such as polyacetal, polybutylene terephthalate, polyamide, polyphenylene sulfide, an ABS resin, polyethylene, polypropylene, polyphenylene oxide, a liquid crystalline resin, and a biodegradable resin.

As mentioned above, one of features of an addition reaction type silicone-based composition includes excellent heat resistance. When a thermoplastic resin having high heat resistance is employed as the thermoplastic resin, an integrated molded product having excellent heat resistance is obtained, and it is also possible to sufficiently make use of features of the addition reaction type silicone-based composition. From such a point of view, among the above thermoplastic resins, polybutylene terephthalate, which is excellent in heat resistance and can be preferably used in combination with a flame retardant, is most preferable. Thus, polybutylene terephthalate will be described below.

Polybutylene terephthalate is a polybutylene terephthalate-based resin which is obtained by polycondensing a dicarboxylic acid component containing at least terephthalic acid or an ester-forming derivative thereof ($C_{1-6}$ alkyl ester, an acid halide, etc.) with a glycol component containing an alkylene glycol having at least 4 carbon atoms (1,4-butanediol) or an ester-forming derivative thereof (acetylated product, etc.). Polybutylene terephthalate is not limited to homopolybutylene terephthalate, and may be a copolymer which includes 60 mol % or more (particularly 75 mol % or more and 95 mol % or less) of a butylene terephthalate unit.

In the present invention, the amount of a terminal carboxyl group of polybutylene terephthalate to be used is not particularly limited as long as the object of the present invention is not inhibited. The amount of a terminal carboxyl group of polybutylene terephthalate to be used in the present invention is preferably 30 meq/kg or less, and more preferably 25 meq/kg or less. When using polybutylene terephthalate having a terminal carboxyl group within the above range, the obtained polybutylene terephthalate resin composition is less likely to undergo a decrease in strength due to hydrolysis under wet heat environment.

The intrinsic viscosity of polybutylene terephthalate used in the present invention is not particularly limited as long as the object of the present invention is not inhibited. An intrinsic viscosity (IV) of polybutylene terephthalate is preferably 0.60 dL/g or more and 1.2 dL/g or less. The intrinsic viscosity is more preferably 0.65 dL/g or more and 0.9 dL/g or less. When using polybutylene terephthalate having an intrinsic viscosity within the above range, the obtained polybutylene terephthalate resin composition is particularly excellent in moldability. It is also possible to adjust the intrinsic viscosity by blending polybutylene terephthalate having a different intrinsic viscosity. It is possible to prepare polybutylene terephthalate having an intrinsic viscosity of 0.9 dL/g, for example, by blending polybutylene terephthalate having an intrinsic viscosity of 1.0 dL/g with polybutylene terephthalate having an intrinsic viscosity of 0.7 dL/g. The intrinsic viscosity (IV) of polybutylene terephthalate can be measured, for example, in o-chlorophenol under the conditions of a temperature of 35° C.

In polybutylene terephthalate used in the present invention, the dicarboxylic acid component (comonomer component) other than terephthalic acid and an ester-forming derivative thereof includes, for example, $C_{8-14}$ aromatic dicarboxylic acids such as isophthalic acid, phthalic acid, 2,6-naphthalenedicarboxylic acid and 4,4'-dicarboxydiphenyl ether; $C_{4-16}$ alkanedicarboxylic acids such as succinic acid, adipic acid, azelaic acid and sebacic acid; $C_{5-10}$ cycloalkanedicarboxylic acids such as cyclohexanedicarboxylic acid; and ester-forming derivatives ($C_{1-6}$ alkyl ester derivative, acid halide, etc.) of these dicarboxylic acid components. These dicarboxylic acid components can be used alone, or two or more kinds of dicarboxylic acid components can be used in combination.

Among these dicarboxylic acid components, $C_{8-12}$ aromatic dicarboxylic acids such as isophthalic acid, and $C_{6-12}$ alkanedicarboxylic acids such as adipic acid, azelaic acid and sebacic acid are more preferable.

In polybutylene terephthalate used in the present invention, the glycol component (comonomer component) other than 1,4-butanediol includes, for example, $C_{2-10}$ alkylene glycols such as ethylene glycol, propylene glycol, trimethylene glycol, 1,3-butylene glycol, hexamethylene glycol, neopentyl glycol and 1,3-octanediol; polyoxyalkylene glycols such as diethylene glycol, triethylene glycol and dipropylene glycol; alicyclic diols such as cyclohexanedimethanol and hydrated bisphenol A; aromatic diol such as bisphenol A and 4,4'-dihydroxybiphenyl; $C_{2-4}$ alkylene oxide adducts of bisphenol A, such as an ethylene oxide 2 mol adduct of bisphenol A and a propylene oxide 3 mol adduct of bisphenol A; or ester-forming derivatives (acetylated product, etc.) of these glycols. These glycol components can be used alone, or two or more kinds of glycol components can be used in combination.

Among these glycol components, $C_{2-6}$ alkylene glycols such as ethylene glycol and trimethylene glycol, polyoxyalkylene glycols such as diethylene glycol, or alicyclic diols such as cyclohexanedimethanol are more preferable.

The comonomer component usable in addition to the dicarboxylic acid component and the glycol component includes, for example, aromatic hydroxycarboxylic acids such as 4-hydroxybenzoic acid, 3-hydroxybenzoic acid, 6-hydroxy-2-naphthoic acid and 4-carboxy-4'-hydroxybiphenyl; aliphatic hydroxycarboxylic acids such as glycolic acid and hydroxycaproic acid; $C_{3-12}$ lactones such as propiolactone, butyrolactone, valerolactone and caprolactone (ε-caprolactone, etc.); and ester-forming derivatives ($C_{1-6}$ alkyl ester derivative, acid halide, acetylated product, etc.) of these comonomer components.

Any polybutylene terephthalate copolymer copolymerized with the above-described comonomer component can be preferably used as polybutylene terephthalate. It is also possible to use, as a polybutylene terephthalate resin, a homopolybutylene terephthalate polymer in combination with a polybutylene terephthalate copolymer.

Phosphorus Compound

A phosphorus compound is a pentavalent phosphorus compound. The pentavalent phosphorus compound scarcely inhibits curing of an addition reaction type silicone-based composition. The pentavalent phosphorus compound includes, for example, phosphorus compounds such as phosphine oxide-based, phosphinate-based, phosphonate-based, phosphate-based, phosphinic amide-based, phosphonodiamidate-based, phosphoramide-based, phosphoramidate-based, phosphordiamidate-based, phosphineimide-based and phosphine sulfide-based compounds, phosphinate, phosphonate and phosphineimide salts. These phosphorus compounds may be used alone, or a plurality of phosphorus compounds may be used in combination.

The phosphorus compound may be sometimes used as a flame retardant. In this case, the flame retardant imparts flame retardance to a resin molded product. The resin molded product including the flame retardant added therein is a resin molded product which may be in contact with flame, and is also required to have heat resistance. As mentioned above, in the present invention, taking account of the fact that an addition reaction type silicone-based composition is excellent in heat resistance, the integrated molded product of the present invention can be preferably employed in applications, to which flame retardance is required, when a thermoplastic resin having excellent heat resistance is selected.

The case where the phosphorus compound is used as a flame retardant includes, for example, the case where the content of the phosphorus compound in a resin molded product is 10% by mass or more and 30% by mass or less. When the content of the phosphorus compound is within the above range, the degree of flame retardance to be imparted varies depending on the type of the phosphorus compound, but the flame retardance is imparted to the resin molded product. Even when the content of the phosphorus compound is more than the above upper limit, the phosphorus compound exerts the effect as the flame retardant. However, from the viewpoint of making use of properties of other components such as polybutylene terephthalate, the content is preferably the upper limit or less.

A phosphinate is a phosphorus compound which is particularly preferable as the flame retardant. The phosphinate includes, for example, phosphinic acid, diphosphinic acid, or a salt [a boron salt (boryl compound, etc.), an ammonium salt, a salt with an amino group-containing nitrogen-containing compound, etc.), in addition to a metal salt] of a polymer (or condensate, for example, polyphosphinic acid, etc.) thereof. These phosphinates can be used alone, or two or more phosphinates can be used in combination. The phosphinate may have either chain or cyclic structure.

Phosphinic acid, diphosphinic acid or a polymer thereof, which forms a salt, may be phosphinic acid or diphosphinic acid which does not have an organic group. Usually, it is often an organic phosphinic acid, an organic diphosphinic acid, or a polymer (or a condensate) of the organic diphosphinic acid. The above salt may contain these phosphinic acids alone, or contain two or more phosphinic acids in combination.

Among phosphinic acids, a metal salt is particularly preferable. Examples of the metal forming a salt include alkali metal (potassium, sodium, etc.), alkali earth metal (magnesium, calcium, etc.), transition metal (iron, cobalt, nickel, copper, etc.), Group 12 metal of the Periodic Table (zinc, etc.) and Group 13 metal of the Periodic Table (aluminum, etc.). The metal salt may contain these metals alone, or contain two or more metal salts in combination. Among metals, alkali earth metal (magnesium, calcium, etc.) and Group 13 metal of the Periodic Table (aluminum, etc.) are preferable.

A valence of metal is not particularly limited and may be, for example, about mono- to tetravalent, and is preferably bi- to tetravalent, and more preferably bi- or trivalent.

Preferable phosphinate is specifically a compound represented by the following formula (I), and preferable diphosphinate is specifically a compound represented by the following formula (II). Phosphorus compounds represented by the following formulas (I) and (II) can impart flame retardance to a resin molded product without causing deterioration of various physical properties such as moldability, mechanical strength and strong toughness, etc. of the thermoplastic resin.

wherein, $R^1$, $R^2$, $R^3$ and $R^4$ are each the same or different and represent an alkyl group, a cycloalkyl group, an aryl group or an aralkyl group, and $R^5$ represents an alkylene group, an alicyclic bivalent group or an aromatic bivalent group; $R^1$ and $R^2$ may join with each other to form a ring together with adjacent phosphorus atoms, $M^{m+}$ represents a metal having a valence of m, and m is an integer of 2 to 4; and $M^{n+}$ represents a metal having a valence of n, and n is an integer of 2 to 4.

Examples of the hydrocarbon group represented by $R^1$ to $R^4$ include alkyl groups (for example, linear or branched C1-6 alkyl groups such as methyl, ethyl, isopropyl, n-butyl and t-butyl groups), cycloalkyl groups (C5-8 cycloalkyl groups such as a cyclohexyl group); aryl groups (C6-10 aryl groups such as a phenyl group); and aralkyl groups (C6-10 aryl-C1-4 alkyl groups such as a benzyl group). Among these groups, usually, alkyl groups (preferably a C1-4 alkyl group, etc.) and aryl groups (a phenyl group, etc.) are preferable.

A ring formed, when $R^1$ and $R^2$ join with each other and join together with adjacent phosphorus atoms, is a heterocyclic ring (phosphorus atom-containing heterocyclic ring) having, as heteroatoms composing the ring, a phosphorus atom, and is usually a 4- to 20-membered heterocyclic ring, and preferably a 5- to 16-membered heterocyclic ring. The phosphorus atom-containing heterocyclic ring may be a bicyclic ring. The phosphorus atom-containing heterocyclic ring may have a substituent.

Examples of the bivalent hydrocarbon group represented by $R^5$ include an alkylene group (or an alkylidene group, for example, a linear or branched C1-10 alkylene group which may have a substituent such as a C6-10 aryl group, such as a methylene, ethylene, phenylethylene, propylene, trimethylene, 1,4-butanediyl or 1,3-butanediyl group), an alicyclic bivalent group (a C5-8 alicyclic bivalent group such as a cyclohexylene group and a cyclohexadimethylene group) and an aromatic bivalent group [a C6-10 arylene group which may have a substituent such as a C1-4 alkyl group, such as a phenylene group or a tolylene group; an C6-10 arylene-di-C1-4 alkylene group which may have a C1-4 alkyl group such as a methyl group in an arene ring, such as a xylylene group; a bisaryl group which may have a 1-4 alkyl group such as a methyl group in an arene ring (for example, a biphenylene group; a linear or branched C1-4 alkane-di-C6-10 arylene group such as a metadiphenylene group; a bivalent group corresponding to a C6-10 aryl ether such as diphenyl ether; a bivalent group corresponding to a di-C6-10 aryl ketone such as diphenyl ketone; a bivalent group corresponding to a di-C6-10 aryl sulfide such as diphenyl sulfide, etc.)]. Among these bivalent hydrocarbon groups, an alkylene group (particularly, a C1-6 alkylene group, etc.) is preferable.

The metal salts (I) and (II) are preferably polyvalent metal salts in which valences (m and n) of metal M are respectively from 2 to 3.

Specific examples of the metal salt (I) of phosphinic acid include, for example, Al dialkyl phosphinates (Al di-C1-10 alkyl phosphinate, etc.) such as Al dimethyl phosphinate, Al methylethyl phosphinate and Al diethyl phosphinate; Al aryl phosphinates (Al mono- or di-C6-10 aryl phosphinate, etc.) such as Al phenyl phosphinate and Al diphenyl phosphinate; Al alkylaryl phosphinates (Al C1-4 alkyl-C6-10 aryl phosphinate, etc.) such as Al methylphenyl phosphinate; Al salts (Al C3-8 alkylene phosphinate, etc.) of alkylene phosphinic acid which may have a substituent, such as a 1-hydroxy-1H-phospholan-1-oxide Al salt and a 2-carboxy-1-hydroxy-1H-phospholan-1-oxide Al salt; and Ca salts corresponding to these Al salts, and other metal salts.

Specific examples of the metal salt (II) of diphosphinic acid include Al alkanebis(phosphinates) [Al C1-10 alkanebis (phosphinate), etc.] such as Al ethane-1,2-bis(phosphinate); Al alkanebis(alkyl phosphiates) [Al C1-10 alkanebis(C1-6 alkyl phosphinate), etc.] such as Al ethane-1,2-bis(methyl phosphinate); and Ca salts corresponding to these Al salts, and other metal salts.

Polyvalent metal salts of phosphinic acid and/or a polymer or a condensate of polyvalent metal salts of diphosphinic acid are also included in metal salts of phosphinic acid.

The phosphinate is preferably at least one selected from polyvalent metal salts of phosphinic acid, polyvalent metal salts of diphosphinic acid and polyvalent metal salts of a polymer (or condensate) of diphosphinic acid.

Preferable phosphinate is particularly a dialkylphosphinic acid metal salt (Ca salt, Al salt, etc.), or an alkanebisphosphinic acid metal salt (Ca salt, Al salt, etc.) among metal salts represented by the above formula (I) or (II).

An average particle size of the phosphinate is preferably 10 μm or less. The average particle size is more preferably 8 μm or less, and still more preferably 5 μm or less. The smaller the average particle size, the more the molded product tends to look better and be excellent in toughness and flame retardance improving effect. The average particle size of phosphinic acids is obtained as a median diameter by a laser diffraction/scattering particle size distribution analyzer.

The phosphorus compound, which is preferably usable as a flame retardant, includes a phosphoric ester, in addition to the above phosphinates. It is possible to use any of an aliphatic phosphoric ester, an aromatic phosphoric ester and an aromatic fused phosphoric ester. Examples of the aliphatic phosphoric ester include trimethyl phosphate, triethyl phosphate and tributyl phosphate. Examples of the aromatic phosphoric ester include triphenyl phosphate, tricresyl phosphate, cresyl diphenyl phosphate, trixylenyl phosphate, cresyl 2,6-xylenyl phosphate, tris(t-butylated phenyl)phosphate, tris(isopropylated phenyl)phosphate and isopropylated triaryl phosphate. Examples of the aromatic fused phosphoric ester include resorcinol bis(diphenyl phosphate), bisphenol A bis(diphenyl phosphate) and resorcinol bis(dixylenyl phosphate). Among these phosphoric esters, an aromatic fused phosphoric ester is preferably used. Among the aromatic fused phosphoric ester, a resorcinol bis(dixylenyl phosphate) is preferably used.

While a description was made about a phosphorus compound used as a flame retardant, a phosphorus compound used as a stabilizer will be described below. As used herein, the stabilizer includes, for example, a stabilizer used to prevent discoloration of a resin molded product under high-temperature conditions. The resin molded product including the stabilizer added therein assumes use under high-temperature conditions, and is required to have high heat resistance as an integrated molded product. As mentioned above, in the present invention, since an addition reaction type silicone-based composition is excellent in heat resistance, an integrated molded product of the present invention can be preferably employed in applications used under high-temperature conditions, when a resin having excellent heat resistance is selected as a thermoplastic resin.

The case where a phosphorus compound is used as a stabilizer refers to, for examples, the case where 0.01% by mass or more 3.0% by mass or less of a phosphorus compound is contained in a resin molded product. The stabilization and the degree of stabilization depend on the type of a phosphorus compound and the content of a phosphorus compound and, when the content of the phosphorus compound in a resin molded product is within the above range, the effect as the stabilizer may be exerted. Even when the content of the phosphorus compound is more than the above upper limit, the effect as the stabilizer is exerted. However, from the viewpoint of making use of properties of other components such as polybutylene terephthalate, the content is preferably the upper limit or less.

Examples of the stabilizer include at least one selected from inorganic phosphorous-based stabilizers (an alkali metal or an alkaline earth metal phosphate, etc.) and organic phosphorous-based stabilizers (for example, an organic phosphoric ester, an organic phosphonic acid ester). The phosphorous-based stabilizer may be either liquid or solid.

Examples of the alkali metal phosphate include alkali metal salts such as phosphate or corresponding hydrogen phosphate (for example, potassium phosphate, sodium phosphate [(monosodium phosphate (disodium hydrogen phosphate), disodium phosphate (sodium hydrogen phosphate, sodium monohydrogen phosphate, disodium hydrogen phosphate), etc.)]. Examples of the alkaline earth metal phosphate include alkali earth metal salts such as calcium phosphate [monocalcium phosphate (calcium dihydrogen phosphate, calcium bis(dihydrogen phosphate)monohydrate, etc.), second calcium phosphate (calcium hydrogen phosphate, calcium hydrogen phosphate dehydrate, etc.), etc.] and magnesium phosphate (magnesium hydrogen phosphate, dimagnesium hydrogen phosphate, etc.). The alkali metal salt or alkali earth metal salt may be either an anhydride or a hydrate. Sodium phosphate and calcium phosphate are particularly preferable.

Examples of the organic phosphoric ester include mono- to trialkyl esters of phosphoric acid (for example, mono- to di-C6-24 alkyl esters such as monostearyl acid phosphate and distearyl acid phosphate etc.), and mono- to triaryl esters of phosphoric acid (mono- or di-C6-10 aryl ester such as mono- or diphenyl phosphate).

Examples of the organic phosphonic acid ester include mono- or dialkyl phosphonates (C6-24 alkyl phosphonate, etc.) such as distearyl phosphonate; aryl phosphonates in which an aryl group may have a substituent (C6-10 aryl phosphonate, etc.) such as diphenyl phosphonate and di(nonylphenyl) phosphonate; and mono- or diaralkyl phosphonates ((C6-10 aryl-C1-6 alkyl)phosphonate, etc.) such as dibenzyl phosphonate.

Other Components

It is possible to add, in addition to the above thermoplastic resin and phosphorus compound, conventionally known additives such as inorganic fillers, antioxidants and pigments, to the resin molded product in a range that effects of the present invention are not impaired. It is particularly preferred to use a glass fiber, which is one of inorganic fillers, since heat resistance of a resin molded product is enhanced.

Addition Reaction Type Silicone-Based Composition

The addition reaction type silicone-based composition is a composition which is cured at room temperature or heating, and conventionally known compositions can be used. For example, it is possible to use any addition reaction type silicone-based composition used in adhesive applications, potting agent applications, sealing agent applications and coating agent applications, etc. The addition reaction type silicone-based composition as used herein is appropriately selected depending on applications and required functions. Curing proceeds by an addition reaction using a platinum-based catalyst.

It can be often confirmed whether or not an influence is exerted on cure inhibition by simply directly adding a phosphorus compound to a silicone-based composition, followed by a curing treatment under curing conditions which are considered to be suited for the silicone-based composition. It is possible to judge that cure inhibition does not occur when the silicone-based composition is cured after the above treatment.

Members

Members are not particularly limited and may be other resin molded products, in addition to electronic parts such as sensors, hybrid ICs for automobiles and electric appliances, and semiconductor parts, etc. When members are electronic parts, both adhesion and potting applications are general. In the case of a resin molded product, an addition reaction type silicone-based composition is mainly used for bonding with the thermoplastic resin molded product. The resin molded product may be composed of any resin, and may be specifically composed of either a thermoplastic resin or a thermosetting resin.

EXAMPLES

The present invention will be specifically described by way of Examples and Comparative Examples, but the present invention is not limited to these Examples.

Materials

Polybutylene terephthalate resin (PBT): manufactured by WinTech Polymer Ltd. under the trade name of "DURANEX 300FP"

Phosphorus compound 1: aluminum tri(diethyl phosphinate) EXOLIT OP1240, manufactured by Clariant (Japan) K.K.

Phosphorus compound 2: resorcinol bis(dixylenyl phosphate) PX-200, manufactured by DAIHACHI CHEMICAL INDUSTRY CO., LTD.

Phosphorus compound 3: monocalcium phosphate, manufactured by Taihei Chemical Industrial Co., Ltd.

Phosphorus compound 4: sodium dihydrogen phosphate, special grade chemical, manufactured by Wako Pure Chemical Industries, Ltd.

Phosphorus compound 5: tetrakis(2,4-di-t-butylphenyl) 4,4'-biphenylene phosphonite Hostanox P-EPQ, manufactured by Clariant (Japan) K.K.

Phosphorus compound 6: bis(2,4-di-t-butylphenyl)pentaerythritol diphosphite ADEKA STAB PEP-24G, manufactured by ADEKA CORPORATION Glass fiber CS 3J-948, manufactured by Nitto Boseki Co., Ltd.

Addition reaction type silicone-based composition: manufactured by Dow Corning Toray Silicone Co., Ltd. under the trade name of "SE1714"

Preliminary Test for Conforming Whether or not Influence is Exerted on Cure Inhibition In an aluminum cup, 5 g of an addition reaction type silicone-based composition and 50 mg of each phosphorus compound were added, followed by well stirring and a curing treatment at 120° C. for 1.0 hour. The silicone-based composition was cured for the phosphorus compounds 1 to 4, while the silicone-based composition was uncured for the phosphorus compounds 5 and 6.

Production of First Resin Molded Product and Second Resin Molded Product

According to the formulation (unit is % by mass) shown in Table 1, PBT, a phosphorus compound and a glass fiber were melt-kneaded (at a cylinder temperature of 260° C., a screw revolution of 130 rpm and an extrusion amount of 15 kg/hour) by a twin screw extruder to form pellets. The obtained pellets were dried at 140° C. for 3 hours and then charged in an injection molding machine (S2000i 100B, manufactured by FANUC CORPORATIONS) to produce resin test pieces (multi-purpose test pieces in conformity with ISO3167) used for the below-mentioned measurement of an adhesive strength. The center portion of each of test piece in conformity with ISO3167 was cut, and one portion was used as a first resin molded product, while the other portion was used as a second resin molded product.

Production of Integrated Molded Product

Figure 3A:
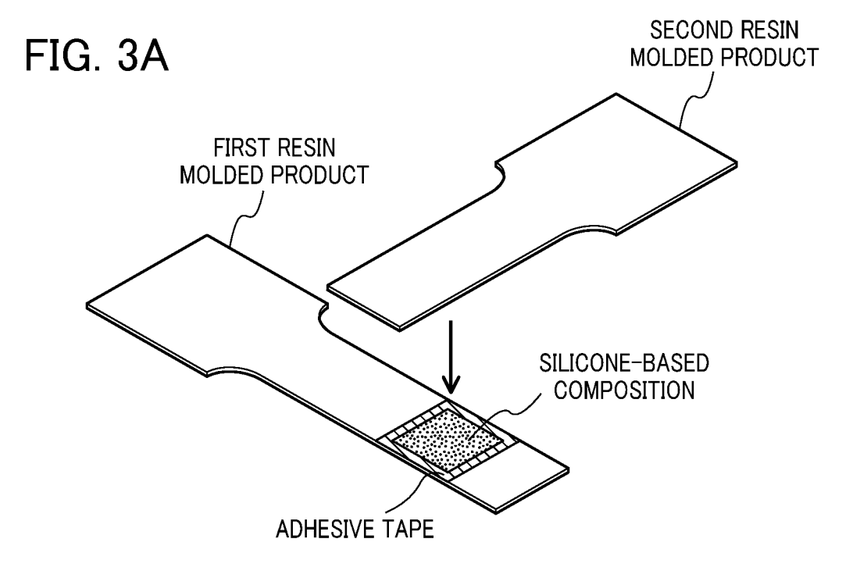
FIG. 3A is a view showing the production process of the integrated molded product and FIG. 3B is a view showing a method for evaluation of the integrated molded product.

As shown in FIG. 3A, a NITOFLON adhesive tape (0.18 mm in thickness) manufactured by Nitto Denko Corporation provided with a hole measuring 7 mm×7 mm formed thereon was affixed to a first resin molded product, and then a silicone-based composition was applied to the portion of the hole. After application, a second resin molded product was laid on top of the first resin molded product, followed by fixation using a clip and further adhesion under the conditions at 120° C. for 0.5 hour. As a result, integrated molded products of Examples and Comparative Examples were obtained.

Measurement of Adhesive Strength

Figure 3B:
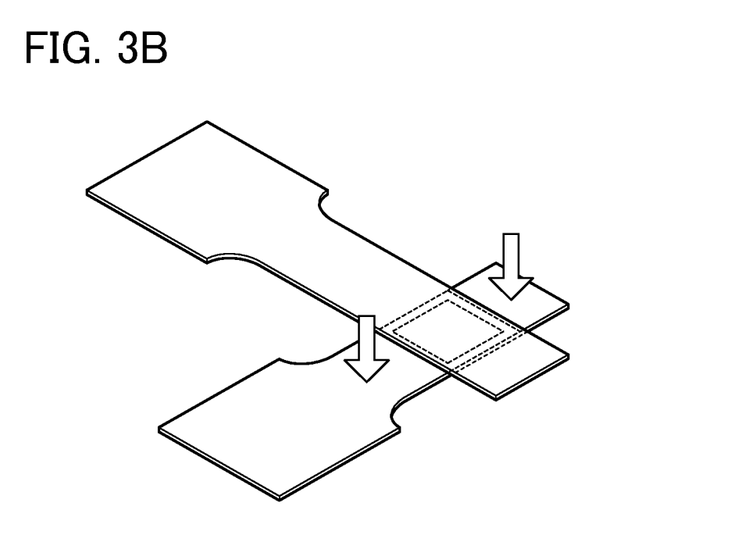

Each of bonded bodies was left in the atmosphere at 23° C. and 50% RH for 24 hours or more and fixed as shown in FIG. 3B. Then, a second resin molded product was peeled off under the condition of a test speed of 5 mm/minute using a universal testing machine Tensilon RTC-1325PL, manufactured by Orientec Corporation (specifically, peeling was performed by applying a pressure in the direction of outlined arrow in FIG. 3B), and a maximum value of a peel strength was measured. The measurement results are shown in Table 1.

TABLE 01

|  | Example | | | | | | Comparative Example | |
| --- | --- | --- | --- | --- | --- | --- | --- | --- |
|  | 1 | 2 | 3 | 4 | 5 | 6 | 1 | 2 |
| PBT | 69 | 56 | 69 | 69 | 69 | 56 | 69 | 69 |
| Phosphorus compound 1 | 1 | 14 | | | | | | |
| Phosphorus compound 2 | | | | | 1 | 14 | | |
| Phosphorus compound 3 | | | 1 | | | | | |
| Phosphorus compound 4 | | | | 1 | | | | |
| Phosphorus compound 5 | | | | | | | 1 | |
| Phosphorus compound 6 | | | | | | | | 1 |
| Glass fiber | 30 | 30 | 30 | 30 | 30 | 30 | 30 | 30 |
| Adhesive strength(MPa) | 5 | 5.3 | 5 | 5 | 5 | 2.8 | Not cured | Not cured |

The results of Examples and those of Comparative Examples revealed that the use of a trivalent phosphorus compound inhibits curing of an addition reaction type silicone-based composition, while the use of a pentavalent phosphorus compound does not inhibit curing of an addition reaction type silicone-based composition.

In Examples 2 and 6, the pentavalent phosphorus compound is mixed in the amount enough to act as a flame retardant. Therefore, it was confirmed that integrated molded products imparted with flame retardance are obtained in Examples 2 and 6.

In Examples 1 and 3 to 5, the pentavalent phosphorus compound is mixed in the amount enough to act as a stabilizer. Therefore, it was confirmed that integrated molded products, which stably exist under high-temperature conditions, are obtained in Examples 1 and 3 to 5.

The invention claimed is:
1. An integrated molded product comprising a thermoplastic resin molded product, an addition reaction type silicone-based composition, and a member,
   the thermoplastic resin molded product consisting of a polybutylene terephthalate-based resin and a pentavalent phosphorus compound, or consisting of a polybutylene terephthalate-based resin, a pentavalent phosphorus compound, and at least one component selected from the group consisting of an inorganic filler, an antioxidant, and a pigment,
   the member being adhered to the thermoplastic resin molded product, and the thermoplastic resin molded product being in contact with the addition reaction type silicone-based composition in any one of the following states (A) to (C):
(A) a state wherein the thermoplastic resin molded product and the member are bonded through the addition reaction type silicone-based composition;
(B) a state wherein the thermoplastic resin molded product is composed of a plurality of molded products and the plurality of molded products are bonded through the addition reaction type silicone-based composition; and
(C) a state wherein the addition reaction type silicone-based composition covers the surface of the member disposed on the thermoplastic resin molded product and is in contact with the thermoplastic resin molded product.

2. The integrated molded product according to claim 1, wherein the pentavalent phosphorus compound is at least one selected from the group consisting of a phosphinate represented by the following formula (I), and a diphosphinate represented by the following formula (II):

(I)

(II)

wherein, $R^1$, $R^2$, $R^3$ and $R^4$ are each the same or different and represent an alkyl group, a cycloalkyl group, an aryl group or an aralkyl group, and $R^5$ represents an alkylene group, an alicyclic bivalent group or an aromatic bivalent group; $R^1$ and $R^2$ may join with each other to form a ring together with adjacent phosphorus atoms; $M^{m+}$ represents a metal having a valence of m, and m is an integer of 2 to 4; and $M^{n+}$ represents a metal having a valence of n, and n is an integer of 2 to 4.

3. The integrated molded product according to claim 1, wherein the pentavalent phosphorus compound is a phosphoric ester.

4. The integrated molded product according to claim 1, wherein the pentavalent phosphorus compound is at least one selected from the group consisting of an alkali metal phosphate and an alkaline earth metal phosphate.

* * * * *